(12) United States Patent
Smith

(10) Patent No.: US 9,106,874 B2
(45) Date of Patent: Aug. 11, 2015

(54) METHOD AND SYSTEM OF EDITING MULTIPLE SPOT COLOR TABLES ASSOCIATED WITH A PRINTING SYSTEM

(71) Applicant: Xerox Corporation, Norwalk, CT (US)

(72) Inventor: Mark A. Smith, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/718,505

(22) Filed: Dec. 18, 2012

(65) Prior Publication Data

US 2014/0168712 A1 Jun. 19, 2014

(51) Int. Cl.
*H04N 1/60* (2006.01)
*H04N 1/40* (2006.01)

(52) U.S. Cl.
CPC ..................................... *H04N 1/603* (2013.01)

(58) Field of Classification Search
USPC .......................................... 358/1.9, 518, 504
See application file for complete search history.

(56) References Cited

U.S. PATENT DOCUMENTS

| | | | |
|---|---|---|---|
| 6,157,469 A | 12/2000 | Mestha | |
| 6,178,007 B1 | 1/2001 | Harrington | |
| 6,744,531 B1 | 6/2004 | Mestha et al. | |
| 7,069,164 B2 | 6/2006 | Viturro et al. | |
| 7,738,140 B2 | 6/2010 | Hancock et al. | |
| 8,023,156 B2 | 9/2011 | Mestha et al. | |
| 2002/0093684 A1 | 7/2002 | Bares et al. | |
| 2005/0030560 A1 | 2/2005 | Maltz et al. | |
| 2006/0285135 A1* | 12/2006 | Mestha et al. | 358/1.9 |
| 2007/0002342 A1* | 1/2007 | Morales et al. | 358/1.9 |
| 2009/0161125 A1 | 6/2009 | Mestha et al. | |
| 2010/0189348 A1 | 7/2010 | Dalal et al. | |
| 2011/0069077 A1 | 3/2011 | Chen et al. | |

* cited by examiner

*Primary Examiner* — Quang N Vo
(74) *Attorney, Agent, or Firm* — Fay Sharpe LLP

(57) ABSTRACT

This disclosure provides a method and system of generating a plurality of custom spot color look-up tables, each custom spot color look-up table associated with one of a plurality of modes associated with an image marking device. In addition, provided is a job workflow method and system which accesses the plurality of custom spot color look-up tables to print a custom spot color.

19 Claims, 4 Drawing Sheets

METHOD AND SYSTEM OF EDITING MULTIPLE SPOT COLOR TABLES ASSOCIATED WITH A PRINTING SYSTEM

BACKGROUND

The disclosed embodiments generally relate to methods and systems for printer color management in image/text printing or display systems. The embodiments are directed to processes for generating improved spot color accuracy.

To meet customer demand, the commercial printing industry requires the capability of producing spot colors accurately and consistently. Spot colors can be defined as a fixed set of colors which may be Pantone® colors, customer logo colors, colors in a customer's proprietary marked patterns, or customer defined colors in the form of an index color table. Spot colors are often used, or can be used, for large background areas, which may be the most color critical portion of a particular page. Consistent color in these areas may determine the difference between success and failure in meeting customer requirements. Customer demands for color accuracy and consistency are typically much tighter for spot colors than for colors within images.

Existing spot color editors for color printers utilize a manual approach to the adjustment of CMYK combinations of spot colors, for example, prior to raster image processing (RIPing). For example, the document creator may select a Pantone® color for application in specific areas through a user interface on a printing device or computer monitor, such as that available on the Xerox® DocuSP® Controller. The Pantone-provided CMYK combination for the selected printer is obtained from a look-up table. Prior to RIPing the document in the printer, the operator has the option of entering a spot color editor function and specifying an alternative CMYK combination to achieve the desired color. The document is then RIPed and then printed using the spot color editor combinations where specified, and Pantone combinations otherwise.

In addition to spot color editors based on Pantone® colors as discussed above, custom spot color formulas, described in percentage of colorants such as CMYK for a particular color, are sometimes provided by a user of a printing device to print a custom color, also referred to as a named custom spot color.

One problem associated with conventional printing systems which include functionality for a user to create custom spot colors is associated with the ability of the printing device to operate in one of a plurality of states/modes, where each state/mode of the printing device is capable of printing a distinct gamut volume of colors. Consequently, a user specifies a formula for a custom spot color while the printing device is operating in one state, which provides one gamut, and in the event a second state of the printing device is used to complete a print job utilizing the custom spot color, a second gamut distinct from the first gamut is utilized, which may not print the custom spot color as desired by the user.

For some customers, the process of manually adjusting spot colors is far too difficult or time consuming. These customers will always use the built-in static CMYK spot color dictionary and are forced to accept the potentially large accuracy errors that can occur with long term printer variation.

This disclosure provides a method and system to provide editing of multiple custom spot color tables to maintain custom spot color rendering consistency across multiple states of a printing device.

All U.S. patents and published U.S. patent applications cited herein are fully incorporated by reference. The following patents or publications are noted:

U.S. Patent Application Publication No. 2002/0093684 to Bares et al. ("Accurate Printing of Proprietary Mark Patterns and Colors") describes a printing system that provides a dictionary of recognizable patterns and defined colors corresponding to proprietary marks and selected colors. The dictionary is linked to a user interface on which a user may designate a location within a document and one or more of the proprietary marks with defined colors from an accessible menu. A processor associates the defined colors with the image at the specified location and generates a printer signal representative of the colors and image. Alternatively, the processor may include a pattern recognizer for identifying recognizable patterns within a document. Those patterns having a likeness to defined patterns within the pattern dictionary can be converted to the defined patterns for display or imaging.

U.S. Pat. No. 6,157,469 to Mestha ("Dynamic Device Independent Image Correction Method and Apparatus") describes a method of controlling color drift between a desired image and an output image as obtained by a marking device and intended to match the desired image. The method includes detecting a current output color in the output image with a color sensing device, determining a difference between the current output color in the output image and a corresponding color in the desired image, and automatically setting a next output color in the output image equal to a corrected color that minimizes the difference between the next output color and the corresponding color in the output image.

U.S. Pat. No. 6,178,007 to Harrington ("Method for Continuous Incremental Color Calibration for Color Document Output Terminals") teaches a method for continuously upgrading the color calibration for an electrophotographic printer using a color transform look up table stored in memory. A single or small number of color patch samples is printed at regular intervals during the use of the printing machine. The color patches are sensed and a determination made as to the difference between the sensed color and the desired color. A corrective color calibration value is determined for the sensed patch and a correction is made for that color in the printer memory. The process is repeated to assure that all of the colors within the gamut of the machine are continuously updated.

U.S. Pat. No. 6,744,531 to Mestha et al. ("Color Adjustment Apparatus and Method") teaches an apparatus for providing consistent output across a plurality of different hard copy output devices which may be included in a system having an image data source and a hard copy output device. The image data source supplies image data to a printable image data adjusting apparatus. The image data supplied may be in a device-dependent color space or a device-independent color space. For image data in a device-dependent color space, the adjusting apparatus first converts the image data into device-independent image data and stores it in memory as target image data. If the image data is already device-independent, the image data are stored in the memory of the adjusting apparatus as target image data. The printable image data adjusting apparatus then uses the target image data to generate printable image data. The hard copy output device uses the printable image data to generate a hard copy image. The hard copy image is then passed within the optical field of a sensor that detects device-independent image data values of the hard copy image. The detected device-independent image data values are then compared against the target image data to generate color adjustment factors. The color adjustment factors are used to produce a hard copy image having detected device-independent image data values that more closely represent the target image data.

U.S. Pat. No. 7,069,164 to Viturro et al. ("Method for Calibrating a Marking System to Maintain Color Output Consistency Across Multiple Printers") teaches a method for maintaining consistent color output across printers even when the inline sensors have differences in accuracy due to various technical and environmental factors. A spectro-photometer is used to measure the color quality of printed references. Adjustments are then iteratively made until reference charts of desired color quality are obtained. The printed reference allows one to achieve relatively high system performance by removing sensor inaccuracies. Using the printed reference measured by the inline sensor, control systems of each machine are calibrated. At customer sites and at suitable intervals, a reference document can be read using the inline sensor on a reference machine and any differences from expected values can be calibrated out.

U.S. Patent Application Publication No. 2005/0030560 to Maltz et al. ("Methods and Systems for Controlling Out-of-gamut Memory and Index Colors") describes methods and systems in an image processing device for controlling colors that are located external to a gamut. A plurality of color values can be automatically provided as input to said image processing device, wherein the image processing device is under the control of a particular dimensional order, typically a three-dimensional order, but alternatively can be a two-dimensional order. An operation can then be performed dynamically determining which color value among the plurality of color values has attained a gamut limit. Thereafter, the particular dimensional order can be automatically reduced, providing improved control for colors that are located external to the gamut. The plurality of color values analyzed is generally associated with three colors: cyan, magenta, and yellow.

INCORPORATION BY REFERENCE

U.S. Patent Publication No. 2007/0002342, published Jan. 4, 2007, by Morales et al., and entitled "SYSTEMS AND METHODS FOR EVALUATING NAMED COLORS AGAINST SPECIFIED PRINT ENGINES";

U.S. Patent Publication No. 2009/0161125, published Jun. 25, 2009, by Mestha et al., and entitled "METHOD FOR CLASSIFYING A PRINTER GAMUT INTO SUBGAMUTS FOR IMPROVED SPOT COLOR ACCURACY";

U.S. Patent Publication No. 2010/0189348, published Jul. 29, 2010, by Dalal et al., and entitled "SPOT COLOR TABLE COMPENSATION"; and U.S. Patent Publication No. 2011/0069077, published Mar. 24, 2011, by Chen et al., and entitled "METHOD AND SYSTEM FOR OUT-OF-GAMUT SPOT COLOR REPRODUCTION" are all incorporated herein by reference in their entirety.

BRIEF DESCRIPTION

In one embodiment of this disclosure, described is a method of generating a plurality of custom spot color look-up tables, each custom spot color look-up table associated with one of a plurality of modes associated with an image marking device, the method comprising: A) receiving a user defined first colorant recipe for a named custom spot color associated with a first state of the image marking device; B) storing the first colorant recipe and associated named custom spot color in a first look-up table associated with the first state of the image marking device; C) processing the first colorant recipe using a first profile associated with the first state of the image marking device to generate a device independent color space representation of the first colorant recipe; D) processing the device independent color space representation of the first colorant recipe using a second profile associated with a second state of the image marking device to generate a second colorant recipe associated with the named spot color for the second state of the image marking device; and E) storing the second colorant recipe and associated named custom spot color in a second look-up table associated with the second state of the image marking device.

In another embodiment of this disclosure, described is a printing system comprising: an image marking device; and a controller operatively associated with the image marking device, the controller configured to execute computer instructions to perform a process of printing a named custom spot color including: A) receiving instructions to print a named custom spot color; B) determining the active state of the image marking device, the active state one of a plurality of potential states of the image marking device; C) accessing a custom spot color look-up table associated with the active state of the image marking device; D) retrieving from the custom spot color look-up table a colorant recipe associated with the custom spot color; and E) printing the custom spot color using the colorant recipe retrieved in step D).

DETAILED DESCRIPTION

As briefly discussed in the background section, a custom spot color formula which is described in percentages of colorants to render a particular color is only valid for a particular mode or state of print engine operation. Any change in print engine operation that affects the gamut volume of colors printed, requires a changed formula in order for the printing engine to render that same color. A simple way of dealing with this problem is to force a user of the printing engine to maintain and edit the formula in a device independent color space, such as L*a*b*—which is exceptionally unintuitive. Another approach is to maintain an independent CMYK custom spot color table for each gamut the print engine supports, and force the user to manually maintain the desired custom color in numerous tables.

Figure 1:
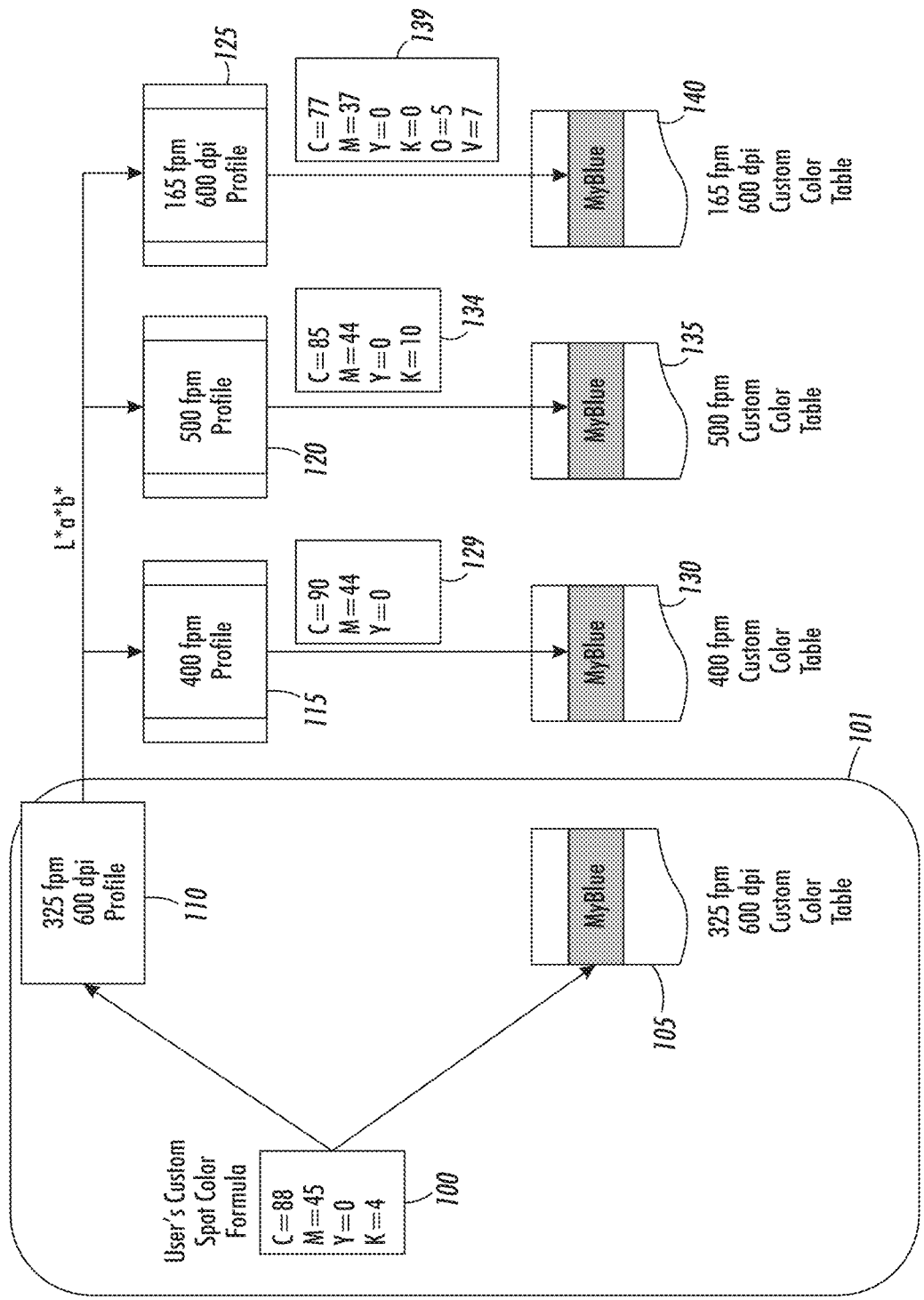
FIG. 1 is a block diagram of a process for generating a plurality of custom spot color look-up tables according to an exemplary embodiment of this disclosure.

According to one exemplary embodiment, the disclosure provides a Digital Front End (DFE) maintaining multiple tables of custom spot color formulas, one per gamut the print engine is able to produce. As shown in FIG. 1, each custom formula includes the percentages of colorants required to print a specific named color. Alternatively, a digital count, or other means, could be used to specify the amount of colorant. After a user creates a new named custom spot color formula 100, the system adds the user-supplied formula to a table 105 associated with the gamut the user is working with. Then, the DFE processes the supplied formula through the associated profile 110 to yield an equivalent L*a*b*. The DFE then processes the L*a*b* through profiles 115, 120 and 125 associated with each of the other custom color tables to produce appropriate colorant formulas 129, 134 and 139, respectively, for the remaining gamuts supported by the print engine. The result is an appropriate colorant formula for every named custom spot color for every gamut supported by the print engine.

Figure 2:
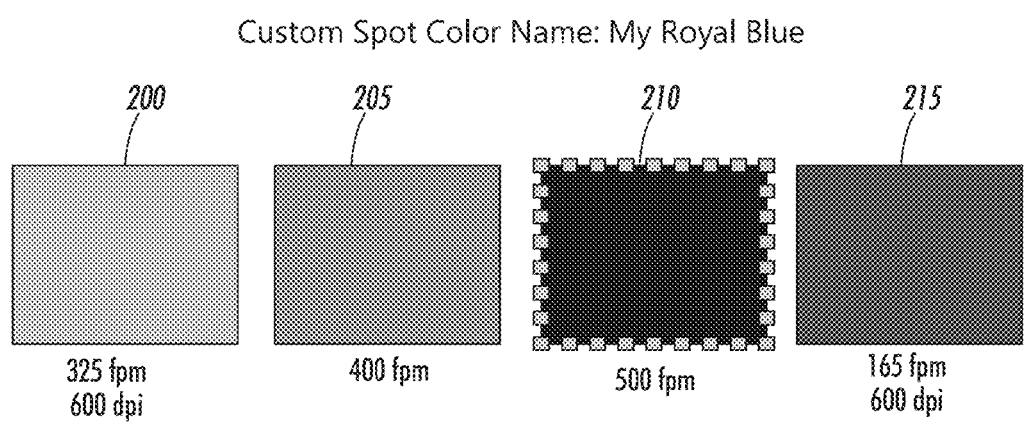
FIG. 2 shows an exemplary embodiment of a custom spot color display, for example on a GUI (Graphical User Interface) used to compare a named color within a variety of contexts.

In many cases, it is not possible to hit a specific color that falls out of a gamut for a particular mode of printer operation. In this case, standard gamut mapping techniques can be employed to generate colorant formulas for the out of gamut color. However, the particular color printed in that gamut will not match the same color printed in a different, wider gamut. According to one exemplary embodiment of this disclosure, provided is an out-of-gamut warning when the user creates the new color, which indicates the particular engine modes are out-of-gamut for that color. In addition, provided is a display of the in-gamut color and the one or more out-of-gamut colors on a calibrated display for viewing by the user. For example, as shown in FIG. 2, the out of gamut indication is shown as a dotted box around the out-of-gamut color patch for the custom spot color "My Royal Blue".

The disclosed embodiments also allow an existing named custom spot color formula to be modified by a user. In this case, a user supplies the existing spot color name and the DFE returns its present colorant formula from the table associated with the gamut the user is working with. Then, the user makes the desired modification to the formula, and the DFE stores the new formula in the custom spot color table for that gamut. Then the DFE determines an equivalent L*a*b* for the color; and then the DFE determines appropriate colorant formulas for every other spot color table on the system, as discussed above.

Notably, the disclosed embodiments work irrespective of the source of gamut difference caused by the print engine mode of operation. For example, gamut differences may be a result of the number or composition of colorants used (e.g. CMY, CMYK, CMYKOV, CMYKOG), the process speed of the engine (e.g. 200 fpm, 500 fpm), the engine halftone selected for the job, etc.

With reference to FIG. 1, illustrated is a method of generating a plurality of custom spot color look-up tables according to an exemplary embodiment of this disclosure. For purposes of describing the method and system disclosed, the multiple modes associated with a representative printing device are related to the web speed of the printing device. For example, the representative printing device has four modes including 165 fpm (feet per minute), 325 fpm, 400 fpm and 500 fpm. As the web speed increases from 165 fpm to 500 fpm, the gamut volume of colors capable of being printed by the device will decrease, thereby providing a relative variance for a specific colorant recipe which is printed at each of the print speeds. In other words, the slower the web speed, more ink per square inch can be deposited which increases the available gamut relative to a higher speed web.

It is to be understood that web speed variance associated with a printing device is just one example of a printing device with multiple modes, each mode having a distinct gamut. Other modes which affect the printing device gamut typically impact the amount of ink that can be laid down per square inch of web. Some examples include: a) ink-limited profiles that artificially constrain the gamut for run-cost reasons, b) operating the print heads in a 'small drop' mode that improves graininess of the printed output at the expense of gamut, and c) operating the print heads at a higher frequency to improve print resolution at the expense of the amount of ink that can be jetted per unit time.

With continuing reference to FIG. 1, initially a user, within the context indicated by box 101, specifies a named custom spot color 100 by entering a colorant formula via a GUI, for example C=88, M=45, Y=0 and K=4. Notably, the user's selection of a particular colorant formula may be an iterative process whereby the user enters a colorant formula and then prints the colorant formula until the desired color is printed.

Next, the method determines the mode of the printing device, which in this example is 325 fpm (feet per minute) and the user provides a name "MyBlue" for C=88, M=45, Y=0, and K=4, which is also associated with the 325 fpm mode of the printing device.

At this point, it is the objective of the disclosed method/system to populate a plurality of color look-up tables 105, 130, 135 and 140, each LUT (look-up table) providing a distinct colorant recipe of MyBlue for the appropriate web speed mode of the printing device. That is, LUT 105 provides a colorant recipe 100 for MyBlue for a 325 fpm printer mode, LUT 130 provides a colorant recipe 129 for MyBlue for a 400 fpm printer mode, LUT 135 provides a colorant recipe 134 for MyBlue for a 500 fpm printer mode, and LUT 140 provides a colorant recipe 139 for MyBlue for a 165 fpm printer mode.

To generate colorant recipes 129, 134 and 139, the method operates as immediately described below.

Initially, the user provided colorant recipe associated with MyBlue is transformed from a device dependent color space to a device independent color space. For example, the CMYK user provided custom spot color recipe is transformed to L*a*b* using a 325 fpm printer profile, which would generally be used for processing a print job printed at 325 fpm. In addition, the 325 fpm profile, as well as the 400 fpm profile, 500 fpm profile and the 165 fpm profile, are constructed during the calibration process of the printing device as briefly discussed in the background section.

The L*a*b* values provided by the printer profile 110 are used as inputs to printer profiles 115, 120 and 125 to generate respective colorant recipes 129, 134 and 139, which represent MyBlue printed at 400 fpm, 500 fpm and 165 fpm, respectively, and are used to populate custom color tables 130, 135 and 140.

With reference to FIG. 2, illustrated is the display of MyBlue for the various modes of the printing device, namely 325 fpm 200, 400 fpm 205, 500 fpm 210 and 165 fpm 215. As can be seen in FIG. 2, patch 200, patch 205 and patch 215 appear relatively consistent in color, indicating to the user, via the GUI, that the named custom spot color MyBlue colorant recipe provided at 325 fpm, will appear as desired for the 400 fpm and 165 fpm modes of the printing device. However, patch 210, with the dotted box, has an appearance which is inconsistent with patches 200, 205 and 215, indicating to the user that MyBlue will not be printed as originally specified when the printing device runs at 500 fpm. At this point, the user may decide whether or not to modify the colorant recipe for MyBlue.

Figure 3:
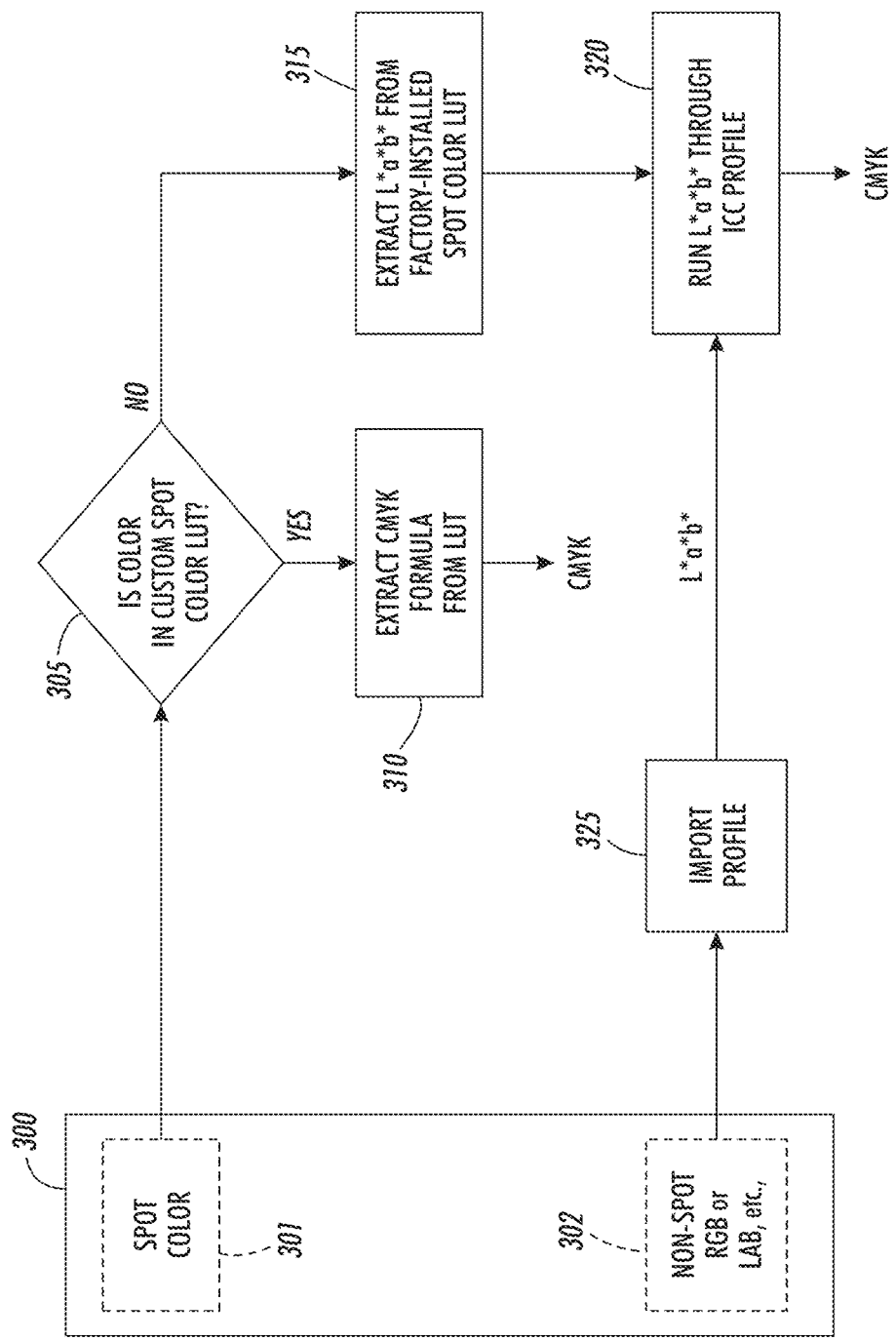
FIG. 3 is a block diagram of a print job workflow according to an exemplary embodiment of this disclosure.

With reference to FIG. 3, illustrated is a color image process which utilizes the LUTs generated for the plurality of modes associated with a printing device as described with reference to FIG. 2.

Block 300 represents a color print job, in part, whereby spot colors 301 and non-spot colors 302 are provided for printing.

At block 305, it is determined whether a spot color provided is in a custom spot color LUT associated with the present printing device mode.

If the spot color is a named custom spot color provided in the custom spot color LUT, the appropriate CMYK formula is extracted from the LUT.

If the spot color is not a named custom spot color provided in the custom spot color LUT, it is presumed to be included in the factory installed spot color LUT and the device independent color space representation, i.e. L*a*b*, is extracted from the factory installed spot color LUT 315.

Next, the extracted L*a*b* associated with the non-custom spot color is transformed from the extracted L*a*b* to the device dependent color space associated with the printing device, i.e. CMYK, using an ICC (International Color Consortium) profile. The ICC profile generated CMYK colorant recipe is used to print the non-custom spot color.

For non-spot colors 302 associated with print job 300, the color image process imports the appropriate profile associated with the current printer mode 325 and transforms the non-spot color representation, i.e. RGB, Lab, etc. to L*A*b*, which is transformed at block 320 to CMYK using the ICC profile. The ICC profile generated CMYK colorant recipe is used to print the non-spot color.

It should be noted, custom spot color colorant recipes extracted at block 310 are used to print the custom spot colors without the use of an ICC profile.

Notably, as previously discussed with reference to FIGS. 1 and 2, a color profile for a particular printer is used to create the necessary custom spot color CMYK values in advance of need. However, in the alternatively, custom spot color CMYK values for a particular printer mode can be generated on-demand where needed for editing via a GUI or printing.

Figure 4:
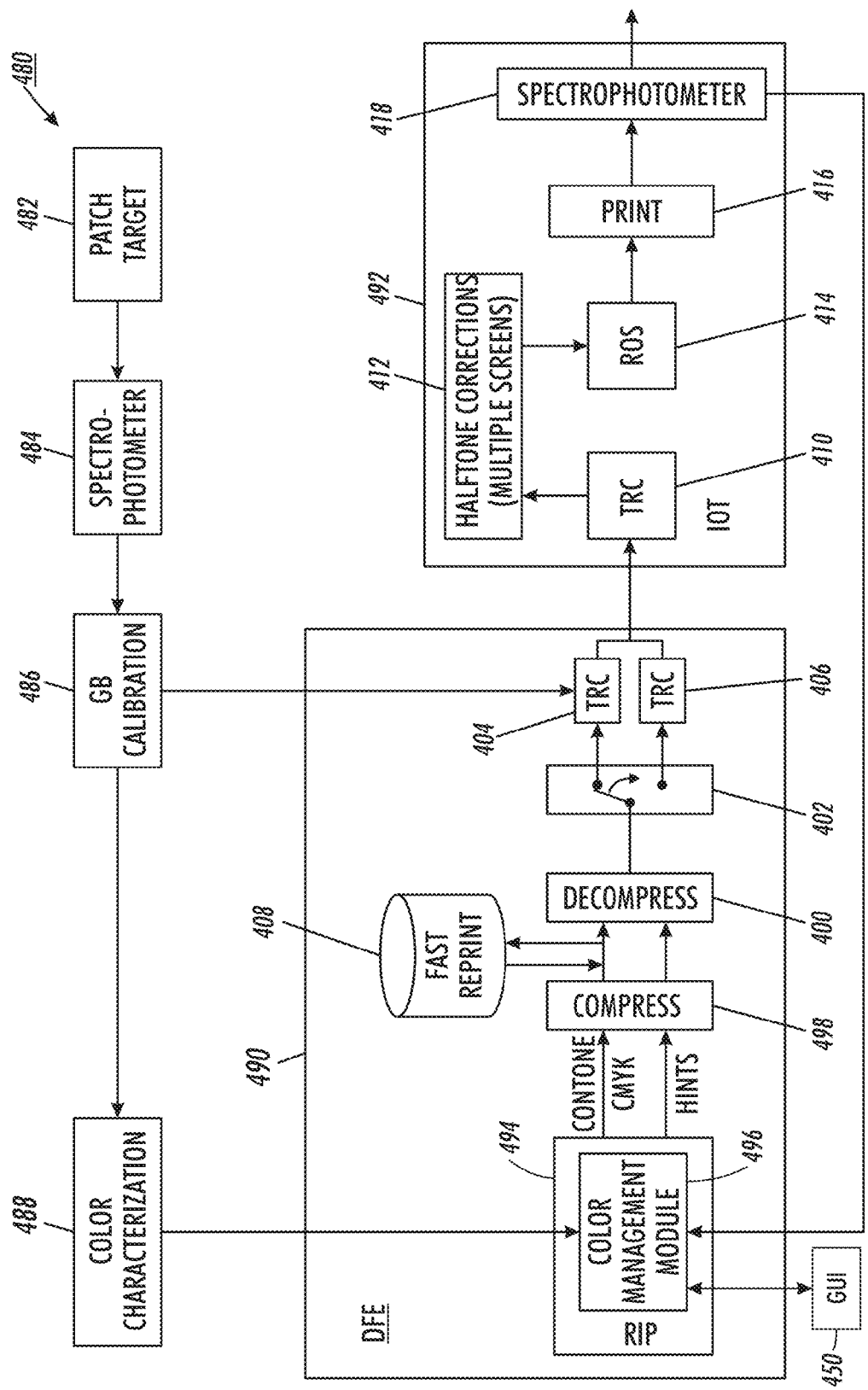
FIG. 4 is a block diagram of a color management system according to an exemplary embodiment of this disclosure.

With reference to FIG. 4, illustrated is a block diagram of a color management system 480 according to an exemplary embodiment of this disclosure. Notably, the system 480 includes an IOT 492 (Image Output Terminal) including a printing device 416, however the system 480 may also include an IOT 492 including a color monitor or display.

The color management system 480 includes a patch target 482, a spectro-photometer 484, a G-B (Gray-Balance) calibration process 486, a color characterization process 488, a DFE 490 (digital front end), an IOT 492 and a GUI (Graphical User Interface) 450. The DFE 490 includes a RIP 494 (Raster Image Process) integrated with a color management module 496 to produce contone CMYK data as discussed heretofore. In addition, the RIP 494 and integrated color management module 496 provide hints for further processing.

In addition to the RIP 494 process, the DFE 490 includes a data compression process 498, a fast reprint process 408, a data de-compression process 400, a TRC (tone reproduction curve), selector 402, a first TRC process 404 and a second TRC process 406.

The IOT 492 includes a TRC process 410, a half tone correction process 412, a ROS (raster output scanner) process 414, a printing process 416 and an in-line spectro-photometer 418 which is operatively connected to the RIP color management module 496 and provides the necessary data feedback to control the color rendering of the printing system as described throughout the specification.

In operation, the patch target 482, spectro-photometer 484, GB calibration 486 and color characterization 488 are associated with the initial calibration of the DFE/IOT system. This calibration process typically takes place at the IOT manufacturing facility.

After the initial calibration, the color management module generates the plurality of custom spot color look-up tables associated with the respective plurality of print modes as discussed with reference to FIGS. 1-3 and throughout this disclosure. The GUI 450, which communicates with the color management module 496, provides a calibrated display for viewing the custom spot colors for the plurality of printer modes and provides the user with the ability to enter custom spot color recipes, etc.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display device.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media: flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer implemented method of generating a plurality of custom spot color look-up tables, each custom spot color look-up table associated with one of a plurality of operational states associated with a single image marking device, and each of the plurality of operational states associated with one of a plurality of respective distinct gamuts capable of being rendered by the image marking device, the method comprising:
   A) receiving a user defined first colorant recipe for a user named custom spot color associated with a first operational state of the image marking device, the first operational state associated with a respective first distinct gamut capable of being rendered by the image marking device;
   B) storing the first colorant recipe and associated user named custom spot color in a first look-up table associated with the first operational state of the image marking device;
   C) processing the first colorant recipe using a first printer calibration color profile associated with the first operational state of the image marking device to generate a device independent color space representation of the first colorant recipe, the first printer calibration color profile including colorant recipes of a reference set of colors not including custom spot colors;
   D) processing the device independent color space representation of the first colorant recipe using a second printer calibration color profile associated with a second operational state of the image marking device to generate a second colorant recipe associated with the named spot color for the second operational state of the image marking device, the second printer calibration color profile including colorant recipes of the reference set of colors not including custom spot colors and, the second operational state associated with a respective second distinct gamut capable of being rendered by the image marking device; and
   E) storing the second colorant recipe and associated named custom spot color in a second look-up table associated with the second operational state of the image marking device.

2. The computer implemented method of generating a plurality of custom spot color look-up tables according to claim 1, further comprising:
   F) rendering the first and second colorant recipes on a display viewable by a user for comparison.

3. The computer implemented method of generating a plurality of custom spot color look-up tables according to claim 2, wherein the user edits the user defined first colorant recipe and steps B)-F) are repeated.

4. The computer implemented method of generating a plurality of custom spot color look-up tables according to claim 1, wherein the first and second operational states of the image marking device are associated with one of speed and resolution.

5. The computer implemented method of generating a plurality of custom spot color look-up tables according to claim 1, wherein the colorant recipes are one of CMYK, CMY, CMYKOV and CMYKOG.

6. The computer implemented method of generating a plurality of custom spot color look-up tables according to claim 1, wherein the image marking engine is one of an inkjet marking engine and a xerographic marking engine.

7. The computer implemented method of generating a plurality of custom spot color look-up tables according to claim 1, wherein the first profile transforms the first colorant recipe to a L*a*b* color space representation and the second profile transforms the L*a*b* color space representation to the second colorant recipe.

8. A printing system comprising:
   an image marking device; and
   a controller operatively associated with the image marking device, the controller configured to execute computer instructions to perform a process of printing a named custom spot color including:
   A) receiving instructions to print a named custom spot color;
   B) determining an active operational state of the image marking device, the active operational state one of a plurality of distinct potential operational states of the image marking device, each of the plurality of distinct potential operational states associated with one of a plurality of respective distinct gamuts capable of being printed by the image marking device;
   C) accessing a custom spot color look-up table associated with the active operational state of the image marking device, the custom spot color look-up table one of a plurality of custom spot color look-up tables wherein each of the plurality of custom spot color look-up tables is associated with one of a plurality of operational states associated with the image marking device, and each of the plurality of operational states associated with one of a plurality of respective distinct gamuts capable of being printed by the image marking device;
   D) retrieving from the custom spot color look-up table a colorant recipe associated with the custom spot color; and
   E) printing the custom spot color using the colorant recipe retrieved in step D),
   wherein the custom spot color LUT associated with the active operational state of the image marking device is generated by a method including:
   F) receiving a user defined first colorant recipe for a user named custom spot color associated with a first operational state of the image marking device, the first operational state associated with a respective first distinct gamut capable of being rendered by the image marking device;

G) storing the first colorant recipe and associated user named custom spot color in a first look-up table associated with the first operational state of the image marking device;

H) processing the first colorant recipe using a first printer calibration color profile associated with the first operational state of the image marking device to generate a device independent color space representation of the first colorant recipe, the first printer calibration color profile including colorant recipes of a reference set of colors not including custom spot colors;

I) processing the device independent color space representation of the first colorant recipe using a second printer calibration color profile associated with a second operational state of the image marking device to generate a second colorant recipe associated with the named spot color for the second operational state of the image marking device, the second operational state associated with a respective second distinct gamut capable of being rendered by the image marking device, the second printer calibration color profile including colorant recipes of the reference set of colors not including custom spot colors; and J) storing the second colorant recipe and associated named custom spot color in a second look-up table associated with the second operational state of the image marking device.

9. The printing system according to claim 8, wherein the first and second operational states of the image marking device are associated with one of speed and resolution.

10. The printing system according to claim 8, wherein the colorant recipes are one of CMYK, CMY, CMYKOV and CMYKOG.

11. The printing system according to claim 8, wherein the image marking engine is one of an inkjet marking engine and a xerographic marking engine.

12. The printing system according to claim 8, wherein the first profile transforms the first colorant recipe to a L*a*b* color space representation and the second profile transforms the L*a*b* color space representation to the second colorant recipe.

13. A computer program product comprising:

a non-transitory computer-usable data carrier storing instructions that, when executed by a computer, cause the computer to perform a method of generating a plurality of custom spot color look-up tables, each custom spot color look-up table associated with one of a plurality of operational states associated with a single image marking device, and each of the plurality of operational states associated with one of a plurality of respective distinct gamuts capable of being rendered by the image marking device, the method comprising:

A) receiving a user defined first colorant recipe for a user named custom spot color associated with a first operational state of the image marking device, the first operational state associated with a respective first distinct gamut capable of being rendered by the image marking device;

B) storing the first colorant recipe and associated user named custom spot color in a first look-up table associated with the first operational state of the image marking device;

C) processing the first colorant recipe using a first printer calibration color profile associated with the first operational state of the image marking device to generate a device independent color space representation of the first colorant recipe, the first printer calibration color profile including colorant recipes of a reference set of colors not including custom spot colors;

D) processing the device independent color space representation of the first colorant recipe using a second printer calibration color profile associated with a second operational state of the image marking device to generate a second colorant recipe associated with the named spot color for the second operational state of the image marking device, the second printer calibration color profile including colorant recipes of the reference set of colors not including custom spot colors and, the second operational state associated with a respective second distinct gamut capable of being rendered by the image marking device; and E) storing the second colorant recipe and associated named custom spot color in a second look-up table associated with the second operational state of the image marking device.

14. The computer program product according to claim 13, the method further comprising:

F) rendering the first and second colorant recipes on a display viewable by a user for comparison.

15. The computer program product according to claim 14, wherein the user edits the user defined first colorant recipe and steps B)-F) are repeated.

16. The computer program product according to claim 13, wherein the first and second operational states of the image marking device are associated with one of speed and resolution.

17. The computer program product according to claim 13, wherein the colorant recipes are one of CMYK, CMY, CMYKOV and CMYKOG.

18. The computer program product according to claim 13, wherein the image marking engine is one of an inkjet marking engine and a xerographic marking engine.

19. The computer program product according to claim 13, wherein the first profile transforms the first colorant recipe to a L*a*b* color space representation and the second profile transforms the L*a*b* color space representation to the second colorant recipe.

* * * * *